US008897901B2

(12) United States Patent
Maekawa et al.

(10) Patent No.: US 8,897,901 B2
(45) Date of Patent: Nov. 25, 2014

(54) COMMAND GENERATOR

(75) Inventors: Kiyoshi Maekawa, Tokyo (JP); Yuko Takehana, Tokyo (JP); Masahiko Hirano, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 382 days.

(21) Appl. No.: 13/264,871

(22) PCT Filed: Apr. 21, 2010

(86) PCT No.: PCT/JP2010/057101
§ 371 (c)(1),
(2), (4) Date: Oct. 17, 2011

(87) PCT Pub. No.: WO2010/125958
PCT Pub. Date: Nov. 4, 2010

(65) Prior Publication Data
US 2012/0035771 A1 Feb. 9, 2012

(30) Foreign Application Priority Data
Apr. 28, 2009 (JP) ................. 2009-109122

(51) Int. Cl.
| G05B 19/18 | (2006.01) |
| G06F 19/00 | (2011.01) |
| G05B 19/416 | (2006.01) |
| B66B 1/30 | (2006.01) |
| B66B 1/28 | (2006.01) |

(52) U.S. Cl.
CPC ................ *B66B 1/30* (2013.01); *G05B 19/416* (2013.01); *B66B 1/285* (2013.01)
USPC .................. 700/56; 700/61; 700/63; 700/186

(58) Field of Classification Search
USPC ........................ 700/56, 61, 63, 186
See application file for complete search history.

(56) References Cited

U.S. PATENT DOCUMENTS 6,782,306 B2 * 8/2004 Yutkowitz ..................... 700/189
6,825,633 B2 * 11/2004 Hamann et al. ............... 318/600
(Continued)

FOREIGN PATENT DOCUMENTS

| JP | 46 5732 | 2/1971 |
| JP | 61 160113 | 7/1986 |

(Continued)

OTHER PUBLICATIONS

WO/2009/144805; published on Mar. 12, 2009; Meakawa et al., 15 pages (including a machine translation performed by Google) printed from WIPO website on Mar. 14, 2014.*

(Continued)

*Primary Examiner* — Ronald Hartman, Jr.
(74) *Attorney, Agent, or Firm* — Oblon, Spivak, McClelland, Maier & Neustadt, L.L.P.

(57) ABSTRACT

A positive & negative jerk interval parameter setting section divides an acceleration & deceleration interval of an acceleration command curve into an acceleration increasing interval, a constant acceleration interval, and an acceleration decreasing interval, and sets the length of time of each interval independently of each other. A positive & negative jerk interval trigonometric command generating section employs an acceleration command curve generated based on a trigonometric function of a ½ cycle, thereby generating a position command or a speed command.

13 Claims, 2 Drawing Sheets

(56) References Cited

U.S. PATENT DOCUMENTS

| | | | |
|---|---|---|---|
| 6,920,378 B2 * | 7/2005 | Eloundou et al. | 700/280 |
| 7,462,998 B2 * | 12/2008 | Akiyama | 318/162 |
| 7,627,387 B2 * | 12/2009 | Ueda et al. | 700/63 |
| 7,727,051 B2 * | 6/2010 | Martin et al. | 451/11 |
| 7,778,716 B2 | 8/2010 | Ueda et al. | |
| 7,801,639 B2 * | 9/2010 | Korajda et al. | 700/193 |
| 8,348,718 B2 * | 1/2013 | Martin et al. | 451/5 |
| 2001/0056324 A1 * | 12/2001 | Miyazawa | 701/200 |
| 2003/0218440 A1 * | 11/2003 | Eloundou et al. | 318/460 |
| 2004/0187665 A1 | 9/2004 | Chezzi | |
| 2007/0075670 A1 * | 4/2007 | Akiyama | 318/651 |
| 2008/0032604 A1 * | 2/2008 | Martin et al. | 451/11 |
| 2008/0188976 A1 * | 8/2008 | Korajda et al. | 700/186 |
| 2011/0035028 A1 | 2/2011 | Maekawa et al. | |

FOREIGN PATENT DOCUMENTS

| | | |
|---|---|---|
| JP | 2000 040658 | 2/2000 |
| JP | 2004-291231 | 10/2004 |
| JP | 2008-186405 A | 8/2008 |
| WO | 2009 144805 | 12/2009 |

OTHER PUBLICATIONS

International Search Report Issued May 25, 2010 in PCT/JP10/057101 Filed Apr. 21, 2010.

Office Action issued Jan. 23, 2013 in Chinese Patent Application No. 201080018702.2 (with English translation).

Office Action issued Oct. 23, 2012 in Japanese Patent Application No. 2010-535704 (with Partial English translation).

Office Action issued Apr. 12, 2013 in Korean Patent Application No. 10-2011-7025463 (with partial English language translation).

Office Action issued on Nov. 12, 2013 in the corresponding Taiwanese Patent Application No. 10221543570 (with partial English Translation).

* cited by examiner

COMMAND GENERATOR

FIELD

The present invention relates to a command generator, and more particularly to a command generator which generates a position command or a speed command of a mechanical system such as mounting machines, semiconductor manufacturing apparatus, injection molding machines, robots, machine tools, packaging machines, and printing machines.

BACKGROUND

Conventional command generators have been required to prevent excitation of high-frequency vibrations caused by an accelerated stage and reduce the setting time. To meet the requirements, there is a method including: dividing an acceleration & deceleration interval into three intervals of an acceleration increasing interval, a constant acceleration interval, and an acceleration decreasing interval; expressing position commands for the acceleration increasing interval and the acceleration decreasing interval as respective 7th-order functions; and determining each coefficient of the 7th-order functions so that the rate of change of acceleration (also referred to as jerk) varies continuously with time (Patent Literature 1).

CITATION LIST

Patent Literature

Patent Literature 1: Japanese Patent Application Laid-open No. 2000-40658

SUMMARY

Technical Problem

However, the aforementioned conventional technique employs a 7th-order function to generate a position command. Accordingly, there was a problem that a large amount of calculation was required to determine the start of deceleration, when a stop distance and a remaining distance are compared to start deceleration at the point in time at which the stop distance is equal to or greater than the remaining distance, in order to make a deceleration stop from a current position and a current speed. Furthermore, setting the position command in hourly involves the calculation of a 7th-order function, which requires a large amount of calculation.

The present invention was developed in view of the aforementioned problems. It is therefore an object of the invention to provide a command generator, which can set jerk intervals independently and set jerks continuously, while preventing an increase in the amount of calculation required for generating commands.

Solution to Problem

In order to solve the aforementioned problems and attain the aforementioned object, the command generator is provided with: a positive & negative jerk interval trigonometric command generating section for generating a position command or a speed command by employing an acceleration command curve generated based on a trigonometric function of a ½ cycle.

Advantageous Effects of Invention

This invention produces the effects of being capable of setting jerk intervals independently and setting jerks continuously, while preventing an increase in the amount of calculation required for generating commands.

DESCRIPTION OF EMBODIMENTS

Now, a command generator according to the embodiments of the present invention will be described in more detail below with reference to the drawings. Note that the invention will not be limited by the embodiments.

First Embodiment

Figure 1:
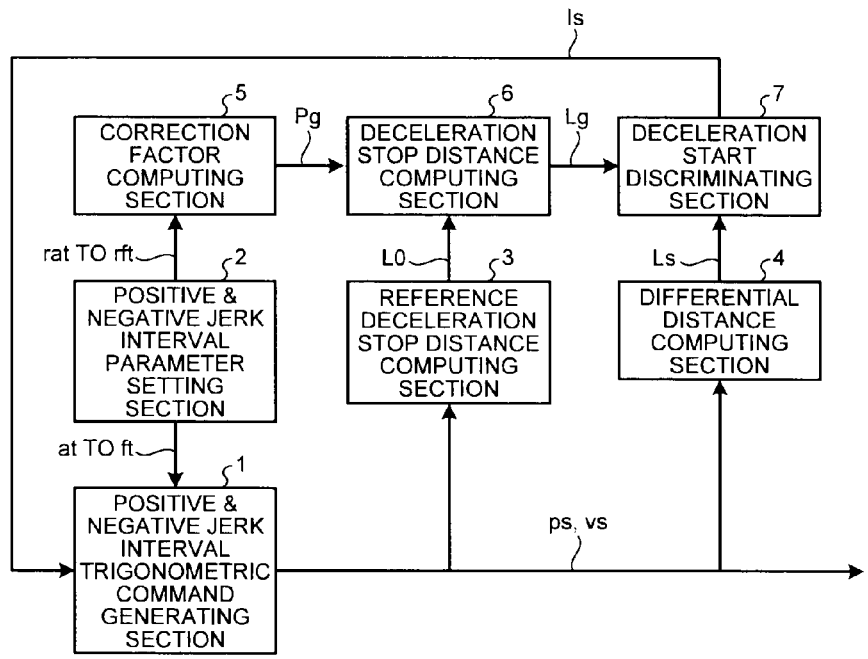
FIG. 1 is a block diagram illustrating the general configuration of a first embodiment of a command generator according to the present invention.

FIG. 1 is a block diagram illustrating the general configuration of a first embodiment of a command generator according to the present invention. In FIG. 1, the command generator is provided with a positive & negative jerk interval trigonometric command generating section 1, a positive & negative jerk interval parameter setting section 2, a reference deceleration stop distance computing section 3, a differential distance computing section 4, a correction factor computing section 5, a deceleration stop distance computing section 6, and a deceleration start discriminating section 7.

Here, referring to an acceleration command curve generated based on a trigonometric function of a ½ cycle, the positive & negative jerk interval trigonometric command generating section 1 can generate a position command ps or a speed command vs at every control cycle (command value generation cycle), based on a pre-set maximum acceleration and maximum speed, and a travel distance or a motion start point and a motion end point which are given to each motion. Note that the positive & negative jerk interval trigonometric command generating section 1 can generate the position command ps or both the position command ps and the speed command vs when providing position control to a mechanical system to be controlled, and can generate the speed command vs when providing speed control to the mechanical system to be controlled.

The positive & negative jerk interval parameter setting section 2 can independently set the lengths of time of the acceleration increasing interval and the acceleration decreasing interval of an acceleration interval as well as those of the acceleration increasing interval and the acceleration decreasing interval of a deceleration interval, and output to the positive & negative jerk interval trigonometric command generating section 1.

The reference deceleration stop distance computing section 3 computes, as a reference deceleration stop distance L0, the distance from the current location to a deceleration stop location, required to make a deceleration stop from a current speed according to a position command or a speed command with the speed command taking a trapezoid pattern of speed (a command with a constant acceleration in an acceleration & deceleration interval).

The differential distance computing section 4 can calculate the target position of a motion or the differential distance, Ls=Pend−Pnow corresponding to the difference between the travel distance covered by the motion (a target position specified by a program for actuating the mechanical system Pend and a current position command Pnow).

The correction factor computing section 5 can calculate a correction factor Pg for each motion of a target to be controlled from a parameter of the time length of a positive & negative jerk interval.

The deceleration stop distance computing section 6 can calculate a deceleration stop distance Lg corresponding to a travel distance required to make a deceleration stop from the current speed, based on the reference deceleration stop distance L0 computed by the reference deceleration stop distance computing section 3 and the correction factor Pg computed by the correction factor computing section 5. For example, the deceleration stop distance is given by Lg=Pg*L0.

The deceleration start discriminating section 7 can compare, at every command generation cycle, the deceleration stop distance Lg computed by the deceleration stop distance computing section 6 with the differential distance Ls computed by the differential distance computing section 4. Then, at the command generation cycle in which the condition Lg≥Ls is satisfied, the deceleration start discriminating section 7 can output a deceleration start command Is for starting deceleration to the positive & negative jerk interval trigonometric command generating section 1.

Figure 2:
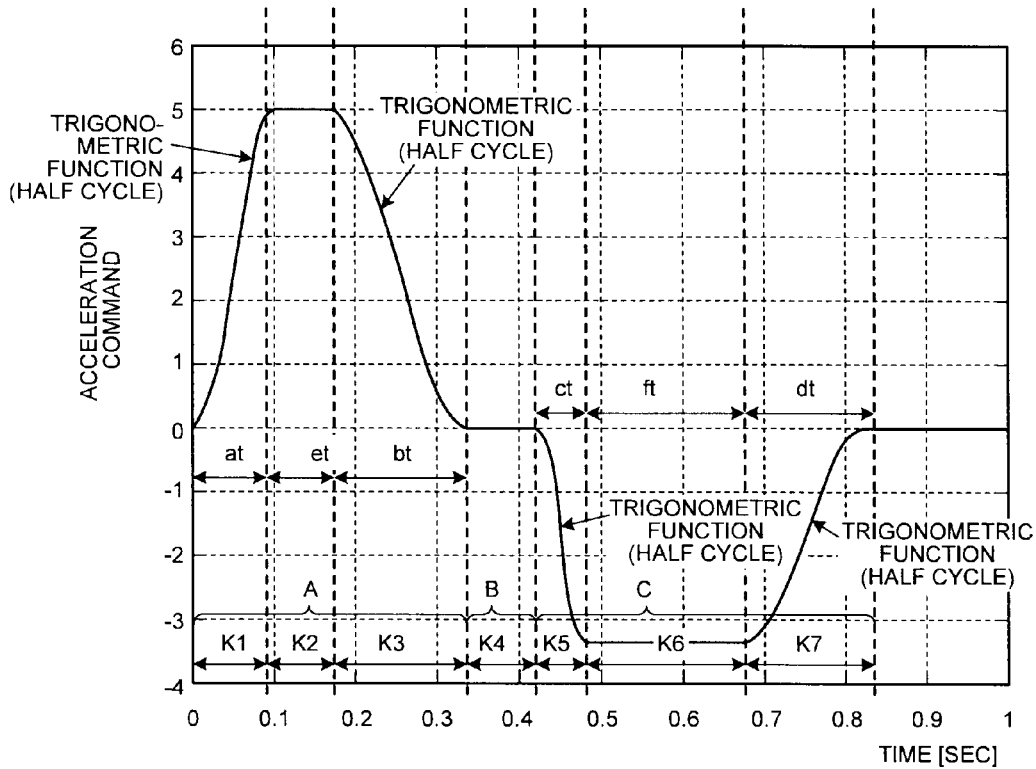
FIG. 2 is a view illustrating an example of an acceleration command curve generated by a positive & negative jerk interval trigonometric command generating section 1 of FIG. 1.

FIG. 2 is a view showing an example of an acceleration command curve generated by the positive & negative jerk interval trigonometric command generating section 1 of FIG. 1. In FIG. 2, the acceleration command curve includes an acceleration interval A, a constant-speed interval B, and a deceleration interval C. Then, when any of the position command and the speed command is viewed in terms of the acceleration command, the acceleration interval A and the deceleration interval C are each divided into three intervals of the acceleration increasing intervals K1 and K7, the constant acceleration intervals K2 and K6, and the acceleration decreasing intervals K3 and K5, respectively. These intervals and the constant-speed interval B are combined into the seven intervals K1 to K7 into which one motion is divided to generate a command.

Furthermore, the acceleration commands for a total of four intervals, i.e., the acceleration increasing intervals K1 and K7 and the acceleration decreasing intervals K3 and K5 are generated, so as to be a trigonometric function of half a cycle (½ cycle) (the trigonometric function may also be multiplied by a constant to add an offset thereto). Here, the cycle of the trigonometric function may be individually set to the four intervals K1, K3, K5, and K7.

Furthermore, the lengths of time of the acceleration increasing intervals K1 and K7, the constant acceleration intervals K2 and K6, and the acceleration decreasing intervals K3 and K5 are given by the positive & negative jerk interval parameter setting section 2. The lengths of time of the acceleration increasing intervals K1 and K7, the constant acceleration intervals K2 and K6, and the acceleration decreasing intervals K3 and K5 are defined as at, dt, et, ft, bt, and ct, respectively (which are all given by the positive & negative jerk interval parameter setting section 2). Furthermore, the maximum acceleration values in the acceleration interval A and the deceleration interval C are defined as aks and ags, respectively. At this time, the position command ps(t) and the speed command vs(t) at t seconds after the start of a motion are generated as below.

That is, the commands can be given by Equations (1) to (10) below up to the constant-speed interval K4. For t≤at (for the acceleration increasing interval K1), $$x=\pi *t/at-\pi/2 \quad (1)$$

$$vs(t)=aks*t/2-aks*at*\cos(x)/2/\pi \quad (2)$$

$$ps(t)=aks*t*t/4-at*at*aks*(\sin(x)+1)/2/\pi/\pi \quad (3)$$

For at<t≤kt2 (for the constant acceleration interval K2: kt2=at+et)

$$vs(t)=v1+aks*(t-at) \quad (4)$$

$$ps(t)=p1+v1*(t-at)+aks*(t-at)*(t-at)/2 \quad (5)$$

For kt2<t≤kt2+bt (for the acceleration decreasing interval K3)

$$x=\pi *(t-kt2)/bt-\pi/2 \quad (6)$$

$$vs(t)=v2+aks*(t-kt2)/2+aks*bt*\cos(x)/2/\pi \quad (7)$$

$$ps(t)=p2+v2*(t-kt2)+aks*(t-kt2)*(t-kt2)/4+ \\ aks*bt*bt*(\sin(x)+1)/2/\pi/\pi \quad (8)$$

For kt2+bt<t (for the constant-speed interval K4 up to the start of deceleration)

$$vs(t)=vs \quad (9)$$

$$ps(t)=p3+vs*(t-kt2-bt) \quad (10)$$

where p1, v1, p2, v2, and p3 can be given by Equations (11) to (15) below, respectively.

$$p1=aks*at*at/4-at*at*aks/\pi/\pi \quad (11)$$

$$v1=aks*at/2 \quad (12)$$

$$p2=p1+v1*(kt2-at)+aks*(kt2-at)*(kt2-at)/2 \quad (13)$$

$$v2=1+aks*(kt2-at) \quad (14)$$

$$p3=p2+v2*bt+aks*bt*bt/4+bt*bt*aks/\pi/\pi \quad (15)$$

Assume that the deceleration start command Is is supplied from the deceleration start discriminating section 7 at time tgs. Then, from the time tgs onward, the position command ps or the speed command vs is generated from the acceleration decreasing interval K5. Then, letting the speed command be vgs and the position command be pgs at the time tgs, the commands can be given at every command generation cycle by Equations (16) to (23) below from the acceleration decreasing interval K5.

For tgs<t≤tgs+ct (for the acceleration decreasing interval K5)
Assuming that t2=t−tgs, $$x=\pi *t2/ct-\pi/2 \quad (16)$$

$$vs(t)=vgs-ags*t2/2+ags*ct*\cos(x)/2/\pi \quad (17)$$

$$ps(t)=pgs+vgs*t2-ags*t2*t2/4+ct*ct*ags*(\sin(x)+1)/ \\ 2/\pi/\pi \quad (18)$$

For tgs+ct<t≤tgs+ct+ft (for the constant acceleration interval K6)
Assuming that t2=t−tgs−ct, $$vs(t)=v1g-ags*t2 \quad (19)$$

$$ps(t)=p1g+v1g*t2-ags*t2*t2/2 \quad (20)$$

For tgs+gt2<t≤tgs+gt2+dt (for the acceleration increasing interval K7: gt2=ct+ft)
Assuming that t2=t−tgs−gt2, $$x = \pi * t2/dt - \pi/2 \quad (21)$$

$$vs(t) = v2g - ags*t2/2 - ags*dt*\cos(x)/2/\pi \quad (22)$$

$$ps(t) = p2g + v2g*t2 - ags*t2*t2/4ags*dt*dt*(\sin(x)+1)/2/\pi/\pi \quad (23)$$

For t>tgs+gt2+dt, it is assumed that both the acceleration command and the speed command are 0, and the position command is indicative of the target position.

In the equations above, p1g, v1g, p2g, and v2g can be given by Equations (24) to (27) below, respectively.

$$p1g = pgs + vgs*ct - ags*ct*ct/4 + ct*ct*ags/\pi/\pi \quad (24)$$

$$v1g = vgs - ags*ct/2 \quad (25)$$

$$p2g = p1g + v1g*(gt2-ct) - ags*(gt2-ct)*(gt2-ct)/2 \quad (26)$$

$$v2g = v1g - ags*(gt2-ct) \quad (27)$$

Now, a description will be made to the operation of the command generator. In the positive & negative jerk interval parameter setting section 2, the lengths of time at, et, bt, ct, ft, and dt of the acceleration increasing intervals K1 and K7, the constant acceleration intervals K2 and K6, and the acceleration decreasing intervals K3 and K5 are set, respectively, and then output to the positive & negative jerk interval trigonometric command generating section 1. Furthermore, the maximum acceleration values aks and ags of the acceleration interval A and the deceleration interval C are also set, respectively, and then output to the positive & negative jerk interval trigonometric command generating section 1.

Note that when the lengths of time at, et, bt, ct, ft, and dt of the acceleration increasing intervals K1 and K7, the constant acceleration intervals K2 and K6, and the acceleration decreasing intervals K3 and K5 have been directly specified, the specified values are output, with no change made thereto, to the positive & negative jerk interval trigonometric command generating section 1.

Furthermore, assume that speed commands are generated according to a speed command with a constant acceleration (or the position command, referred to as a trapezoid speed pattern), and given as the ratios rat, ret, rbt, rct, rft, and rdt to an acceleration time kt and a deceleration time gt with the maximum acceleration values of the acceleration interval A and the deceleration interval C being aks and ags, respectively. In this case, the lengths of time at, et, bt, ct, ft, and dt of the acceleration increasing intervals K1 and K7, the constant acceleration intervals K2 and K6, and the acceleration decreasing intervals K3 and K5 are calculated by Equations (28) to (33) below, and then output to the positive & negative jerk interval trigonometric command generating section 1. Furthermore, the ratios rat, ret, rbt, rct, rft, and rdt to the acceleration time kt and the deceleration time gt are output to the correction factor computing section 5.

$$at = rat*kt \quad (28)$$

$$et = ret*kt \quad (29)$$

$$bt = rbt*kt \quad (30)$$

$$ct = rct*gt \quad (31)$$

$$ft = rft*gt \quad (32)$$

$$dt = rdt*gt \quad (33)$$

Here, when the time lengths at, et, bt, ct, ft, and dt have been directly specified, the ratios rat, ret, rbt, rct, rft, and rdt to the acceleration time kt and the deceleration time gt can be calculated from Equations (34) to (39) below.

$$rat = at/kt \quad (34)$$

$$ret = et/kt \quad (35)$$

$$rbt = bt/kt \quad (36)$$

$$rct = ct/gt \quad (37)$$

$$rft = ft/gt \quad (38)$$

$$rdt = dt/gt \quad (39)$$

Note that the maximum acceleration values aks and ags of the acceleration interval A and the deceleration interval C may be given by reading the parameters each specified for every command generator, or by reading the settings specified in a program for operating the command generator. Furthermore, when the maximum acceleration values aks and ags of the acceleration interval A and the deceleration interval C are not set in the program, a pre-set value for each command generator may also be employed.

Here, letting the maximum speed set by the program for the motion of the target to be controlled be vmax, the acceleration time kt and the deceleration time gt can be calculated from Equations (40) and (41) below, respectively.

$$kt = v\text{max}/aks \quad (40)$$

$$gt = v\text{max}/ags \quad (41)$$

Note that the lengths of time at, bt, ct, and dt or the ratios rat, rbt, rct, and rdt to the acceleration time kt and the deceleration time gt can be independently set.

Then, when the lengths of time at, et, bt, ct, ft, and dt of the acceleration increasing intervals K1 and K7, the constant acceleration intervals K2 and K6, and the acceleration decreasing intervals K3 and K5 are output to the positive & negative jerk interval trigonometric command generating section 1, the acceleration command curve is generated based on the trigonometric function of a ½ cycle in the positive & negative jerk interval trigonometric command generating section 1. Then, when the target position of the motion of the target to be controlled or the travel distance Pend covered by the motion is given to the positive & negative jerk interval trigonometric command generating section 1, either one of or both the position command ps and the speed command vs are generated based on the acceleration command curve at every command generation cycle, and then output to the reference deceleration stop distance computing section 3 and the differential distance computing section 4.

Note that to output the position command ps from the positive & negative jerk interval trigonometric command generating section 1, ps(t) is output at every command generation cycle; to output the speed command vs from the positive & negative jerk interval trigonometric command generating section 1, vs(t) is output at every command generation cycle; and to output both the position command ps and the speed command vs from the positive & negative jerk interval trigonometric command generating section 1, ps(t) and vs(t) are output.

Here, since the acceleration command of the positive & negative jerk interval is expressed by a trigonometric function of half a cycle, the speed command vs(t) of the positive & negative jerk interval can be expressed by a linear equation of a trigonometric function and time t, while the position command ps(t) can be expressed by a second-order equation of a trigonometric function and time t.

Then, when either one of or both the position command ps and the speed command vs are supplied to the reference deceleration stop distance computing section 3, the distance L0 from the current location to a stop position required to make a deceleration at the maximum constant acceleration value ags from vn is calculated, where vn is the value of the current speed command vs(t). The distance L0 is then output to the deceleration stop distance computing section 6. Note that the distance L0 from the current location to a stop position is a travel distance that is required to make a deceleration stop from the speed vn at the maximum constant acceleration value ags, and can be thus given by Equation (42) below:

$$L0 = vn*vn/ags/2 \qquad (42).$$

Furthermore, when either one of or both the position command ps and the speed command vs are input to the differential distance computing section 4, the target position of a motion of a target to be controlled or the differential distance Ls=Pend−Pnow corresponding to the difference between the amount of travel Pend covered by the motion and the current position command Pnow is calculated, and then output to the deceleration start discriminating section 7. Here, it is assumed that Pnow=ps(t).

Furthermore, when the ratios rat, ret, rbt, rct, rft, and rdt to the acceleration time kt and the deceleration time gt are input from the positive & negative jerk interval parameter setting section 2 to the correction factor computing section 5, the correction factor Pg for correcting the deceleration stop distance Lg calculated by the deceleration stop distance computing section 6 is calculated and then output to the deceleration stop distance computing section 6. Note that the correction factor Pg can be calculated from the ratio of the travel distance required to make a deceleration stop at a constant acceleration to the travel distance required to make a deceleration stop by the positive & negative jerk interval trigonometric function command, and given by Equation (43) below.

$$Pg = (1+rct) + 2*(\frac{1}{8}-1/\pi/\pi)*(rdt*rdt-rct*rct) \qquad (43)$$

Note that since the ratios rct and rdt to the acceleration time kt and the deceleration time gt are constant during the motion of the target to be controlled, Equation (43) has to be operated only once at the start of each motion and thus does not need to be done at every command generation cycle.

Then, the reference deceleration stop distance L0 computed by the reference deceleration stop distance computing section 3 is input to the deceleration stop distance computing section 6, and the correction factor Pg computed by the correction factor computing section 5 is input to the deceleration stop distance computing section 6. Then, the deceleration stop distance Lg=Pg*L0 required to make a deceleration stop by the positive & negative jerk interval trigonometric function command is calculated at every command generation cycle and output to the deceleration start discriminating section 7.

Then, the differential distance Ls computed by the differential distance computing section 4 is input to the deceleration start discriminating section 7, and the deceleration stop distance Lg computed by the deceleration stop distance computing section 6 is input to the deceleration start discriminating section 7. Then, the deceleration stop distance Lg and the differential distance Ls are compared with each other at every command generation cycle. Then, when the condition Lg≥Ls is satisfied for the first time after the start of the motion, the deceleration start command Is is output at the command generation cycle to the positive & negative jerk interval trigonometric command generating section 1. Then, when the deceleration start command Is is input to the positive & negative jerk interval trigonometric command generating section 1, the position command ps or the speed command vs generated by the positive & negative jerk interval trigonometric command generating section 1 is applied to the acceleration decreasing interval K5 of FIG. 2, allowing the position command ps or the speed command vs to be sequentially generated according to Equations (16) to (23).

As described above, according to the first embodiment, four positive & negative jerk interval lengths can be set independently, and the acceleration command curve can be generated based on a trigonometric function of a ½ cycle, thereby making it possible to set a jerk continuously while preventing an increase in the amount of calculation. Furthermore, the reference deceleration stop distance L0 required to make a stop at a constant acceleration is multiplied by the correction factor Pg, thereby allowing for calculating the deceleration stop distance Lg required to make a deceleration stop from the current position and speed. This makes it possible to reduce the amount of calculation required to determine the start of deceleration. Furthermore, since the jerk is zero at the start and end of the positive & negative jerk interval, the jerk can always be made continuous in all the motion intervals (the acceleration increasing intervals K1 and K7, the constant acceleration intervals K2, K4, and K6, and the acceleration decreasing intervals K3 and K5). The target to be controlled of the mechanical system can be thus moved smoothly.

Second Embodiment

Figure 3:
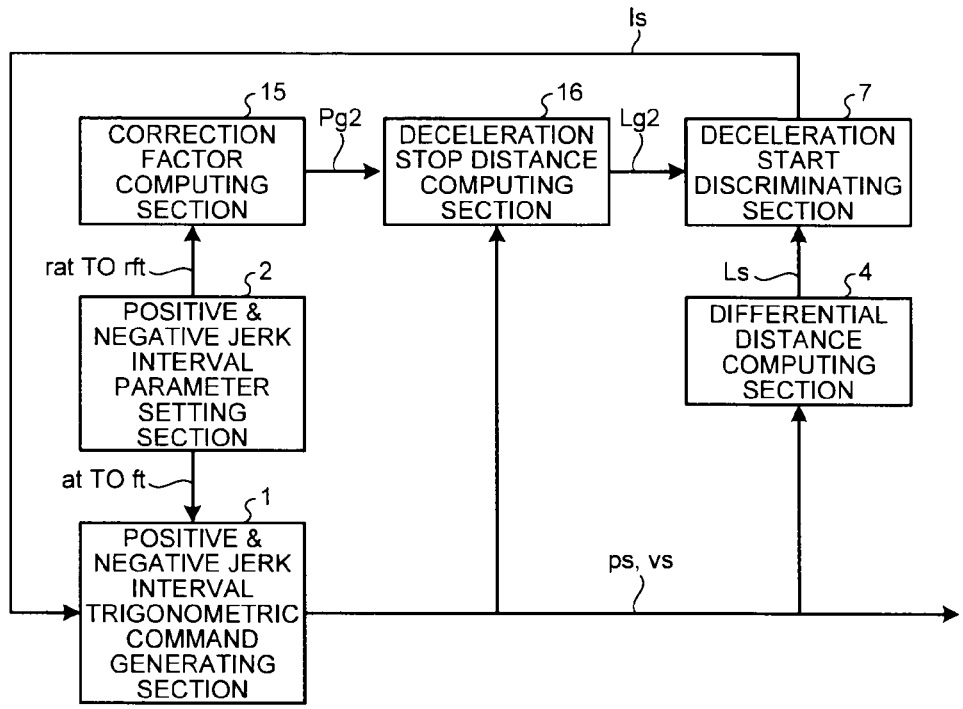
FIG. 3 is a block diagram illustrating the general configuration of a second embodiment of a command generator according to the present invention.

FIG. 3 is a block diagram illustrating the general configuration of a second embodiment of a command generator according to the present invention. In FIG. 3, this command generator is provided with a correction factor computing section 15 and a deceleration stop distance computing section 16, instead of the reference deceleration stop distance computing section 3, the correction factor computing section 5, and the deceleration stop distance computing section 6 of FIG. 1.

Here, the correction factor computing section 15 can calculate a correction factor Pg2 for each motion of a target to be controlled, based on the parameter of the length of time of a positive & negative jerk interval and the maximum acceleration value of a deceleration interval.

The deceleration stop distance computing section 16 can calculate a deceleration stop distance Lg2 corresponding to the travel distance required to make a deceleration stop from the current speed, based on the position command ps or the speed command vs generated at the positive & negative jerk interval trigonometric command generating section 1 and the correction factor Pg2 computed by the correction factor computing section 15.

Then, when the ratios rat, ret, rbt, rct, rft, and rdt to the acceleration time kt and the deceleration time gt are input from the positive & negative jerk interval parameter setting section 2 to the correction factor computing section 15, the correction factor Pg2 for correcting the deceleration stop distance Lg2 calculated by the deceleration stop distance computing section 16 is calculated, and then output to the deceleration stop distance computing section 16. Note that from the ratios rat, rbt, rct, and rdt to the acceleration time kt and the deceleration time gt and from the maximum acceleration value ags of the deceleration interval, the correction factor Pg2 can be given by Equation (44) below.

$$Pg2 = ((1+rct)/2 + (\frac{1}{8}-1/\pi/\pi)*(rdt*rdt-rct*rct))/ags \qquad (44)$$

Then, the position command ps or the speed command vs generated at the positive & negative jerk interval trigonometric command generating section 1 is input to the deceleration stop distance computing section 16, and the correction factor Pg2 computed by the correction factor computing section 15 is input to the deceleration stop distance computing section 16. Then, the deceleration stop distance Lg2 required to make a deceleration stop by the positive & negative jerk interval trigonometric function command is calculated at every command generation cycle, and then output to the deceleration start discriminating section 7. Note that from the correction factor Pg2 computed by the correction factor computing section 15 and the current speed command vn=vs(t), the deceleration stop distance Lg2 can be given by Equation (45) below.

$$Lg2 = Pg2*vn*vn \quad (45)$$

$$Lg = Pg2*vn*vn \quad (45)$$

As described above, according to the second embodiment, four positive & negative jerk interval lengths can be set independently, and the acceleration command curve can be generated based on a trigonometric function of a ½ cycle, thereby making it possible to set a jerk continuously while preventing an increase in the amount of calculation. Furthermore, multiplying the square of the current speed by a constant allows for calculating the deceleration stop distance Lg2 required to make a deceleration stop from the current position and speed. This makes it possible to reduce the amount of calculation required to determine the start of deceleration. Furthermore, since the jerk is zero at the start and end of the positive & negative jerk interval, the jerk can always be made continuous in all the motion intervals (the acceleration increasing intervals K1 and K7, the constant acceleration intervals K2, K4, and K6, and the acceleration decreasing intervals K3 and K5). The target to be controlled of the mechanical system can be thus moved smoothly.

Third Embodiment

Figure 4:
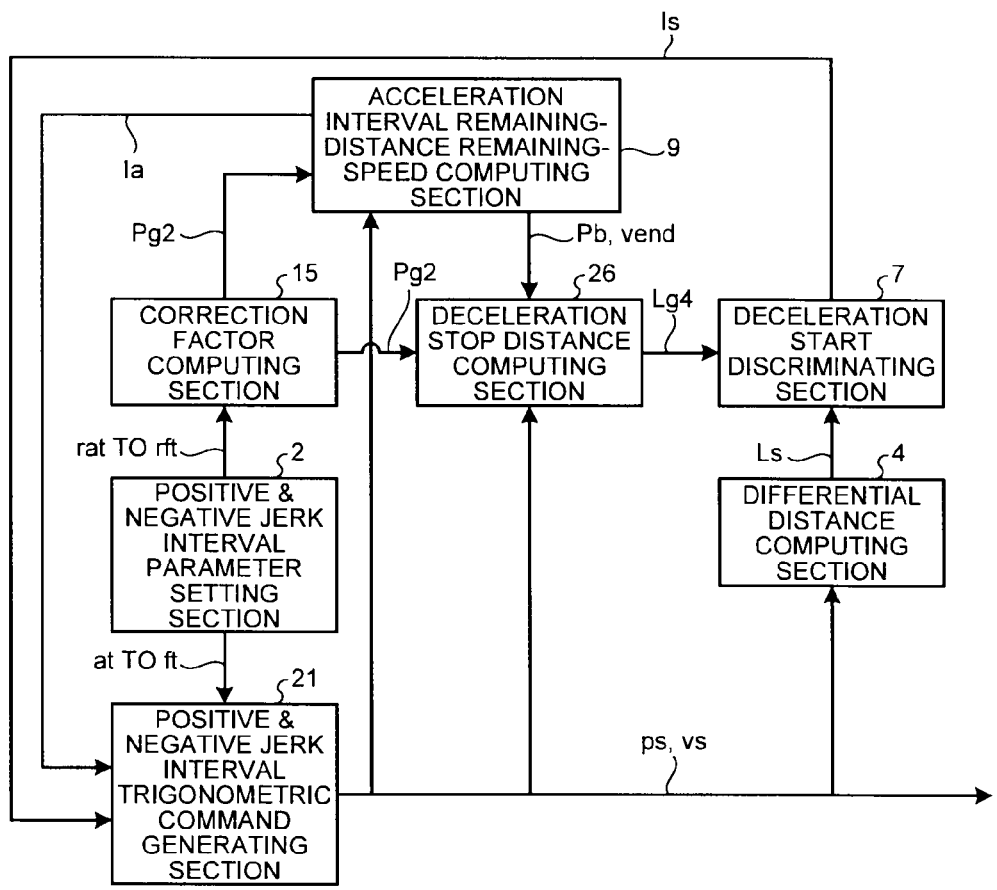
FIG. 4 is a block diagram illustrating the general configuration of a third embodiment of a command generator according to the present invention.

FIG. 4 is a block diagram illustrating the general configuration of a third embodiment of a command generator according to the present invention. In FIG. 4, this command generator is provided with a positive & negative jerk interval trigonometric command generating section 21, a deceleration stop distance computing section 26, and an acceleration interval remaining-distance remaining-speed computing section 9, instead of the positive & negative jerk interval trigonometric command generating section 1 and the deceleration stop distance computing section 16 of FIG. 3.

Here, in the acceleration increasing interval K1 of the acceleration interval A or the constant-speed interval B of FIG. 2, a new acceleration decreasing curve may be generated from the current position command, speed command, and acceleration command to reach zero acceleration. In this case, the acceleration interval remaining-distance remaining-speed computing section 9 can output a start of decreasing acceleration command for starting decreasing acceleration to the positive & negative jerk interval trigonometric command generating section 21, based on an acceleration interval remaining speed vz corresponding to an increase in speed until zero acceleration is reached and an acceleration interval remaining distance Pb corresponding to the amount of travel until zero acceleration is reached.

The deceleration stop distance computing section 26 can calculate the deceleration stop distance Lg4 corresponding to the travel distance required to make a deceleration stop from the current speed, based on the acceleration interval remaining speed vz and the acceleration interval remaining distance Pb generated at the acceleration interval remaining-distance remaining-speed computing section 9 and the correction factor Pg2 computed by the correction factor computing section 15.

Referring to the acceleration command curve generated based on a trigonometric function of a ½ cycle, the positive & negative jerk interval trigonometric command generating section 21 can generate the position command ps or the speed command vs at every control cycle (command value generation cycle), based on the pre-set maximum acceleration and maximum speed, and the travel distance or the motion start point and the motion end point, which are given to each motion. Furthermore, the positive & negative jerk interval trigonometric command generating section 21 can start deceleration based on the deceleration start command Is output from the deceleration start discriminating section 7, and can also start reducing acceleration based on the start of decreasing acceleration command Ia output from the acceleration interval remaining-distance remaining-speed computing section 9.

Then, when the position command ps or the speed command vs is input to the acceleration interval remaining-distance remaining-speed computing section 9, it is determined whether the motion is in the acceleration increasing interval K1 of the acceleration interval A or the constant-speed interval B. Then, when generating a new acceleration decreasing curve from the current position command, speed command, and acceleration command to reach zero acceleration, in the acceleration increasing interval K1 of the acceleration interval A or the constant-speed interval B, an increase in speed (acceleration interval remaining speed) vz until zero acceleration is reached and the amount of travel (acceleration interval remaining distance) Pb until zero acceleration is reached are calculated.

More specifically, the acceleration interval remaining speed vz and the acceleration interval remaining distance Pb can be calculated from Equations (46) to (48) below, by employing the current acceleration command an, the ratio rbt of the acceleration decreasing interval K3, the maximum speed vmax, and the maximum acceleration value aks.

$$vz = an*an*rbt*vs/aks/aks \quad (46)$$

$$bbt = an*rbt*kt/aks \quad (47)$$

$$Pb = vn*bbt + an*bbt^2*(\tfrac{1}{4} + 1/\pi^2) \quad (48)$$

Note that the current acceleration command an may be calculated from the difference between speed commands vs or alternatively from the differential equations of Equations (2) and (4) with respect to time.

Then, at the first command generation cycle in which the condition vz≥vmax−vn is satisfied, the start of decreasing acceleration command Ia is output to the positive & negative jerk interval trigonometric command generating section 21. Furthermore, the process computes vend=vn+vz from the acceleration interval remaining speed vz and the current speed command value vn, to output the acceleration interval remaining distance Pb calculated by Equation (48) and the vend to the deceleration stop distance computing section 26.

Then, when the acceleration interval remaining distance Pb and the vend are input to the deceleration stop distance computing section 26, Equation (49) below can be used to calculate a travel distance Lg3 required to make a stop when starting a deceleration at a point at which zero acceleration is reached. Then, when the travel distance Lg3 is calculated, Equation (50) below can be used to generate a new acceleration decreasing curve from the current position command and speed command to reach zero acceleration, and calculate the deceleration stop distance Lg4 required to make a deceleration stop from the point at which zero acceleration is reached. Then the resulting value is output to the deceleration start discriminating section 7.

$$Lg3 = Pg2 * vend * vend \quad (49)$$

$$Lg4 = Pb + Lg3 \quad (50)$$

Then, when the deceleration stop distance Lg4 is input to the deceleration start discriminating section 7, the deceleration start command Is is output to the positive & negative jerk interval trigonometric command generating section 21 at the command generation cycle in which the condition of Lg4≥Ls is satisfied for the first time after the start of the motion.

Then, when the positive & negative jerk interval trigonometric command generating section 21 has received the start of decreasing acceleration command Ia from the acceleration interval remaining-distance remaining-speed computing section 9 or the deceleration start command Is from the deceleration start discriminating section 7, the process starts generating commands for the acceleration decreasing interval K3 onward with the current time being kt2.

Here, the commands for the acceleration decreasing interval K3 onward may start to be generated based on the start of decreasing acceleration command Ia from the acceleration interval remaining-distance remaining-speed computing section 9. In this case, no deceleration is started until the deceleration start command Is is received from the deceleration start discriminating section 7. But the deceleration is started at the command generation cycle in which the deceleration start command Is is received from the deceleration start discriminating section 7, and thus the command of the acceleration decreasing interval K5 starts to be generated. On the other hand, when the commands for the acceleration decreasing interval K3 onward start to be generated based on the deceleration start command Is from the deceleration start discriminating section 7, the command of the acceleration decreasing interval K5 starts to be generated immediately after the end of generating the command of the acceleration decreasing interval K3, thereby allowing the deceleration to be started.

As described above, according to the third embodiment, starting decreasing acceleration at the first command generation cycle in which the condition of vz≥vmax−vn is satisfied, can prevent discontinuous acceleration even when the deceleration stop is made from the acceleration interval A of FIG. 2.

INDUSTRIAL APPLICABILITY

As described above, the command generator according to the present invention is capable of setting jerk intervals independently and setting jerks continuously while preventing an increase in the amount of calculation required for generating commands. The command generator is applicable to methods for generating a position command or a speed command for mechanical systems such as mounting machines, semiconductor manufacturing apparatus, injection molding machines, robots, machine tools, packaging machines, and printing machines.

REFERENCE SIGNS LIST 1, 21 POSITIVE & NEGATIVE JERK INTERVAL TRIGONOMETRIC COMMAND GENERATING SECTION
2 POSITIVE & NEGATIVE JERK INTERVAL PARAMETER SETTING SECTION
3 REFERENCE DECELERATION STOP DISTANCE COMPUTING SECTION
4 DIFFERENTIAL DISTANCE COMPUTING SECTION
5, 15 CORRECTION FACTOR COMPUTING SECTION
6, 16, 26 DECELERATION STOP DISTANCE COMPUTING SECTION
7 DECELERATION START DISCRIMINATING SECTION
9 ACCELERATION INTERVAL REMAINING-DISTANCE REMAINING-SPEED COMPUTING SECTION

The invention claimed is:

1. A command generator, comprising:
a positive & negative jerk interval trigonometric command generating section that generates, using a computer, a position command or a speed command by employing an acceleration command curve having plural intervals, including an acceleration increasing interval and an acceleration decreasing interval;
a reference deceleration stop distance computing section for computing, as a reference deceleration stop distance, a travel distance required to make a deceleration stop from a current speed at a constant acceleration;
a deceleration stop distance computing section for computing, as a deceleration stop distance, a travel distance required to make a deceleration stop from a current speed based on the reference deceleration stop distance computed by the reference deceleration stop distance computing section;
a differential distance computing section for computing a differential distance corresponding to a difference between a target position and a current position; and
a deceleration start discriminating section for outputting a deceleration start command for starting deceleration to the positive & negative jerk interval trigonometric command generating section based on a result of a comparison between the deceleration stop distance and the differential distance,
wherein at least two of the plural intervals have different lengths of time and the acceleration command curve is generated based on a trigonometric function of a ½ cycle such that a positive & negative jerk varies continuously with time.

2. The command generator according to claim 1, further comprising:
a positive & negative jerk interval parameter setting section for dividing an acceleration & deceleration interval of the acceleration command curve into the acceleration increasing interval, a constant acceleration interval, and the acceleration decreasing interval, connecting each interval such that the positive & negative jerk varies continuously with time, and setting a length of time of each interval independently of each other.

3. The command generator according to claim 1, further comprising a correction factor computing section for computing a correction factor to correct the deceleration stop distance based on a parameter for a length of time of an acceleration increasing interval and an acceleration decreasing interval.

4. A command generator comprising:
a positive & negative jerk interval trigonometric command generating section that generates, using a computer, a position command or a speed command by employing an acceleration command curve having plural intervals, including an acceleration increasing interval and an acceleration decreasing interval;

a deceleration stop distance computing section for computing, as a deceleration stop distance, a travel distance required to make a deceleration stop from a current speed based on a current speed command;

a differential distance computing section for computing a differential distance corresponding to a difference between a target position and a current position; and a deceleration start discriminating section for outputting a deceleration start command for starting deceleration to the positive & negative jerk interval trigonometric command generating section based on a result of a comparison between the deceleration stop distance and the differential distance, wherein at least two of the plural intervals have different lengths of time and the acceleration command curve is generated based on a trigonometric function of a ½ cycle such that a positive & negative jerk varies continuously with time.

5. The command generator according to claim 4, further comprising:

a positive & negative jerk interval parameter setting section for dividing an acceleration & deceleration interval of the acceleration command curve into the acceleration increasing interval, a constant acceleration interval, and the acceleration decreasing interval, connecting each interval such that the positive & negative jerk varies continuously with time, and setting a length of time of each interval independently of each other.

6. A command generator comprising:

a positive & negative jerk interval trigonometric command generating section that generates, using a computer, a position command or a speed command by employing an acceleration command curve having plural intervals, including an acceleration increasing interval and an acceleration decreasing interval;

an acceleration interval remaining-distance remaining-speed computing section for outputting a start of decreasing acceleration command for starting decreasing acceleration to the positive & negative jerk interval trigonometric command generating section, based on an acceleration interval remaining speed corresponding to an increase in speed until zero acceleration is reached and an acceleration interval remaining distance corresponding to an amount of travel until zero acceleration is reached, when a new acceleration decreasing curve is generated from a current position command, speed command, and acceleration command to reach zero acceleration in an acceleration increasing interval or a constant-speed interval of an acceleration interval;

a deceleration stop distance computing section for computing a travel distance required to make a deceleration stop from a current speed as a deceleration stop distance based on the acceleration interval remaining speed and the acceleration interval remaining distance computed by the reference deceleration stop distance computing section;

a differential distance computing section for computing a differential distance corresponding to a difference between a target position and a current position; and a deceleration start discriminating section for outputting a deceleration start command for starting deceleration to the positive & negative jerk interval trigonometric command generating section based on a result of a comparison between the deceleration stop distance and the differential distance, wherein at least two of the plural intervals have different lengths of time and the acceleration command curve is generated based on a trigonometric function of a ½ cycle such that a positive & negative jerk varies continuously with time.

7. The command generator according to claim 6, further comprising a correction factor computing section for computing a correction factor to correct the deceleration stop distance based on a parameter for a length of time of an acceleration increasing interval and an acceleration decreasing interval and a maximum acceleration value of a deceleration interval.

8. The command generator according to claim 6, further comprising:

a positive & negative jerk interval parameter setting section for dividing an acceleration & deceleration interval of the acceleration command curve into the acceleration increasing interval, a constant acceleration interval, and the acceleration decreasing interval, connecting each interval such that the positive & negative jerk varies continuously with time, and setting a length of time of each interval independently of each other.

9. The command generator according to claim 8, further comprising a correction factor computing section for computing a correction factor to correct the deceleration stop distance based on a parameter for a length of time of an acceleration increasing interval and an acceleration decreasing interval and a maximum acceleration value of a deceleration interval.

10. A command generator, comprising:

a positive & negative jerk interval trigonometric command generating section that generates, using a computer, a position command or a speed command by employing an acceleration command curve generated based on a trigonometric function of a ½ cycle such that a positive & negative jerk varies continuously with time;

a reference deceleration stop distance computing section that computes, as a reference deceleration stop distance, a travel distance required to make a deceleration stop from a current speed at a constant acceleration;

a deceleration stop distance computing section that computes, as a deceleration stop distance, a travel distance required to make a deceleration stop from a current speed based on the reference deceleration stop distance computed by the reference deceleration stop distance computing section;

a differential distance computing section that computes a differential distance corresponding to a difference between a target position and a current position; and a deceleration start discriminating section that outputs a deceleration start command for starting deceleration to the positive & negative jerk interval trigonometric command generating section based on a result of a comparison between the deceleration stop distance and the differential distance.

11. The command generator according to claim 10, further comprising a correction factor computing section for computing a correction factor to correct the deceleration stop distance based on a parameter for a length of time of an acceleration increasing interval and an acceleration decreasing interval.

12. A command generator, comprising:

a positive & negative jerk interval trigonometric command generating section that generates, using a computer, a position command or a speed command by employing an acceleration command curve generated based on a trigonometric function of a ½ cycle such that a positive & negative jerk varies continuously with time;

a deceleration stop distance computing section that computes, as a deceleration stop distance, a travel distance required to make a deceleration stop from a current speed based on a current speed command;

a differential distance computing section that computes a differential distance corresponding to a difference between a target position and a current position; and a deceleration start discriminating section that outputs a deceleration start command for starting deceleration to the positive & negative jerk interval trigonometric command generating section based on a result of a comparison between the deceleration stop distance and the differential distance.

13. The command generator according to claim 12, further comprising a correction factor computing section for computing a correction factor to correct the deceleration stop distance based on a parameter for a length of time of an acceleration increasing interval and an acceleration decreasing interval and a maximum acceleration value of a deceleration interval.

\* \* \* \* \*